Patented May 20, 1930

1,759,264

UNITED STATES PATENT OFFICE

ERWIN KRAMER, OF COLOGNE-DEUTZ, BERNHARD BOLLWEG, OF LEVERKUSEN-ON-THE-RHINE, AND LUDWIG ZEH, OF WIESDORF-ON-THE-RHINE, GERMANY, ASSIGNORS TO GENERAL ANILINE WORKS, INC., OF NEW YORK, N. Y., A CORPORATION OF DELAWARE

SULPHUR DYESTUFFS

No Drawing. Application filed June 21, 1928, Serial No. 287,343, and in Germany August 31, 1927.

This invention relates to the manufacture of technically valuable reddish brown sulphur dyestuffs and to the new products obtainable thereby.

The process of manufacture in accordance with this invention is carried out by heating β-binaphthol of the formula

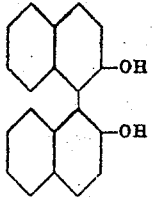

with a sulphur halide, or a mixture of a sulphur halide and sulphur. A diluent such as an indifferent solvent of a high boiling point may be used, for example nitrobenzene, trichlorobenzene, dichlorobenzene, etc.

The new products are generally dark powders difficultly soluble in the usual organic solvents and in concentrated sulphuric acid, in the latter generally with a violet coloration, easily soluble in aqueous sodium sulfide solutions with a brownish-red coloration, dyeing cotton after exposure to air pure reddish-brown shades of good fastness.

The following examples illustrate the invention:

*Example 1.*—20 parts by weight of β-binaphthol are slowly stirred into 46 parts by weight of sulphur mono chloride, $S_2Cl_2$, at about 60–100° C. when a vigorous reaction takes place accompanied by the evolution of hydrogen chloride. When the reaction has subsided the temperature is raised to about 250–260° C. and maintained for about 4 hours. A second reaction takes place with frothing, the melt becomes viscous and finally fairly dry. The dyestuff is purified by dissolving in a sodium sulfide solution and precipitation. The dark brown powder obtained dissolves in water with the addition of sodium sulfide with a brownish red coloration, dyes the fibre in shades of the same color and after exposure to the air becomes reddish-brown.

By keeping the temperature of the sulphurization lower or carrying out the reaction in nitrobenzene a more yellowish dyestuff is obtained.

*Example 2.*—20 parts by weight of β-binaphthol are introduced at 80–100° C. into a mixture of 46 parts by weight of sulphur mono chloride, $S_2Cl_2$, and 20 parts by weight of sulphur and further treated in accordance with the directions of Example 1. The resulting dyestuff produces yellower shades than that obtained according to Example 1.

*Example 3.*—20 parts by weight of β-binaphthol are dissolved in 150 parts by weight of trichlorobenzene and into this solution at about 80–120° C. 46 parts by weight of sulphur mono chloride, $S_2Cl_2$ are stirred. After some time the mixture is heated to boiling for seven hours. The product is a dark powder soluble in aqueous sodium sulfide with a brownish-red coloration, dyeing cotton reddish-brown shades.

We claim:—

1. In the process for the manufacture of sulphur dyes the step which comprises treating β-binaphthol with a compound of the group consisting of sulphur halogenides and mixtures of sulphur with sulphur halogenides at a temperature of about 250–260° C.

2. In the process for the manufacture of sulphur dyes the step which comprises heating β-binaphthol with a sulphurhalide at a temperature of about 250–260° C.

3. In the process for the manufacture of sulphur dyes the step which comprises heating β-binaphthol with a sulphur halide and sulphur at a temperature of about 250–260° C.

4. In the process for the manufacture of sulphur dyes the step which comprises heating β-binaphthol with a compound of the group consisting of sulphur halogenides and mixtures of sulphur with sulphur halogenides and a high boiling indifferent organic solvent to the boiling point of the solvent.

5. In the process for the manufacture of sulphur dyes the step which comprises heating β-binaphthol with a sulphurhalide and a high boiling indifferent organic solvent to the boiling point of the solvent.

6. In the process for the manufacture of sulphur dyes the step which comprises heating β-binaphthol with a sulphur halide, sulphur and a high boiling indifferent organic solvent to the boiling point of the solvent.

7. New sulphur dyestuffs obtainable by sulphurating β-binaphthol by means of a compound of the group consisting of sulphur halides and mixtures of sulphur with sulphur halides, said dyestuffs being generally dark powders, difficultly soluble in the usual organic solvents and in strong sulphuric acid, easily soluble in aqueous sodium sulfide solution with brownish-red coloration, from which solution cotton is dyed to reddish-brown shades of good fastness properties.

8. The new sulphur dyestuff obtainable by treating β-binaphthol with sulphur monochloride in trichlorobenzene, said dyestuff being a dark powder, soluble in aqueous sodium sulfide solution with a brownish red coloration from which solution cotton is dyed a reddish brown shade.

In testimony whereof we have hereunto set our hands.

ERWIN KRAMER. [L. S.]
BERNHARD BOLLWEG. [L. S.]
LUDWIG ZEH. [L. S.]